Aug. 26, 1969   J. A. BIGGERSTAFF ET AL   3,464,013
PEAK CURRENT METER
Filed Jan. 25, 1967   2 Sheets-Sheet 1

INVENTORS.
John A. Biggerstaff
Ronald Nutt
BY
ATTORNEY

United States Patent Office  3,464,013
Patented Aug. 26, 1969

3,464,013
PEAK CURRENT METER
John A. Biggerstaff, Oak Ridge, and Ronald Nutt, Knoxville, Tenn., assignors to the United States of America as represented by the United States Atomic Energy Commission
Filed Jan. 25, 1967, Ser. No. 612,292
Int. Cl. G01r *19/26, 17/06*
U.S. Cl. 324—120                    8 Claims

ABSTRACT OF THE DISCLOSURE

This is an instrument for the accurate measurement of the average peak current over a given sample time of short, repetitive current pulses such as are obtained at the target of pulsed particle accelerators. A bistable biased tunnel diode is connected for sensing the current pulses to be measured. The diode is biased by a feedback loop which provides a current sufficient to bias the tunnel diode just at a value to cause the diode to switch to its second stable state after which it is switched back to its first stable state by a reset signal. The feedback current and the reset signal cause the diode to switch at a fixed rate which is inversely proportional to the open loop gain of the system. When the tunnel diode senses input current pulses, it would be switched at an increased rate except for the action of the feedback current which adjusts automatically to maintain a nearly constant switching rate. The switching signals from the tunnel diode are shaped into standardized current pulses. This output passes through a pulse rate-to-voltage converter circuit which provides a voltage output proportional to the input pulse current amplitude, and the output of the pulse rate-to-voltage converter is fed back through a voltage-to-current converter and inverter to maintain the tunnel diode bias at the correct value for its bistable operation.

BACKGROUND OF THE INVENTION

This invention was made in the course of, or under, a contract with the U.S. Atomic Energy Commission.

The present invention relates to electronic pulse circuitry and more specifically to a circuit for measuring the average amplitude of short, repetitive current pulses.

In the field of measuring nano- and subnano-second current pulses such as those obtained at the target of a Van de Graaff accelerator, there is a need for a more economic measurement of the peak currents of these pulses, while maintaining a high degree of accuracy. For example, the current pulses derived from the fast pulse pickoff of a Van de Graaff accelerator generally range from 0.25 milliamp to 5 milliamps and have widths ranging from 710 nanoseconds to 0.5 nanosecond. The repetition rate of these pulses varies over the range of 30 kHz. to 5 mHz. depending upon the mode of accelerator operation. It is desired that the peak current of these pulses be measured to at least 5 percent as economically as possible and that the meter be generally insensitive to pulse width, shape, or repetition rate.

In the past it has been the practice to use a sampling oscilloscope to measure pulses of this nature. The sampling oscilloscope is a very expensive piece of equipment and presents disadvantages in that it must be calibrated each time it is used for this purpose and requires considerable time to prepare for such measurements. The present instrument does not require calibration once it has been constructed, and it can be incorporated with an accelerator or similar device as a permanent instrument due to its favorable cost, size, simplicity, and reliability.

SUMMARY OF THE INVENTION

Briefly, the present invention is an instrument for measuring the peak amplitude of short, repetitive current pulses with widths of the order of 0.5 nanosecond, or longer, which is independent of pulse width, shape, and repetition rate, these results being obtained in a rapidly acting, inexpensive circuit which provides highly accurate measurement. The invention uses a current biased bistable switching element (e.g., a tunnel diode or snap-off diode) which is switched from one state to the second state by the current pulses to be measured. The change in state of the bistable element is sensed by a fast amplifier which has an output of standardized current pulses of 0.5 microsecond in duration and 25 ma. in amplitude. These pulses are converted to a D.C. voltage by a pulse rate-to-voltage converter, the output of which is proportional to the input current pulse amplitude and can be metered or recorded in terms of the signal current. This voltage is further fed back to the input of the circuit through a voltage-to-current converter and inverter to maintain the switching element bias necessary for bistable operation.

It is therefore an object of this invention to provide an instrument for accurately measuring the peak current of pulses which is insensitive to pulse width, shape, or repetition rate.

Other objects and many of the attendant advantages of this invention will become more apparent from the following detailed description in conjunction with the accompanying drawings.

DESCRIPTION OF THE PREFERRED EMBODIMENT

Figure 1:
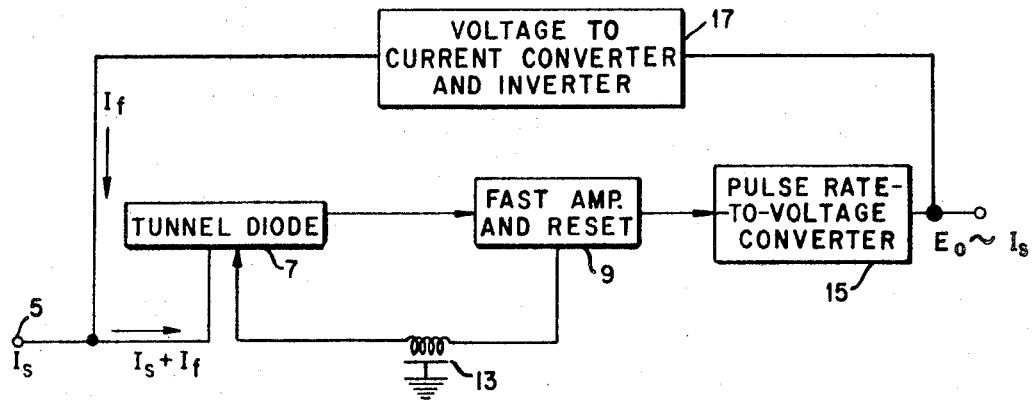
FIGURE 1 is a block diagram representation of a circuit for measuring pulsed currents according to the present invention.

Referring to FIGURE 1, there is shown an instrument according to the present invention which receives signal current pulses $I_s$ via an input terminal 5 and, when combined with a feedback current ($I_f$), biases a tunnel diode 7 for bistable operation. Tunnel diode 7 is the sensing element of the circuit. When diode 7 is switched from one state to the second, the resultant signal feeds a fast amplifier and reset circuit 9 connected to the output of tunnel diode 7. Within this circuit, standardized current pulses of a uniform width and amplitude are produced together with a reset signal. The reset signal is fed back from an output of circuit 9 to an input of diode 7 through a delay line 13. The current pulse output of amplifier 9 is coupled to the input of a pulse rate-to-voltage converter 15 which provides an output voltage proportional to the peak of the measured current $I_s$. This voltage may be calibrated on a meter or recorded in terms of the signal current. In order to maintain the proper bias current in diode 7, the output of pulse rate-to-voltage converter 15 is fed back to the diode through a voltage-to-current converter and inverter 17 which converts the voltage to a proportional current $I_f$. The currents $I_f$ and $I_s$ are then combined to provide the diode bias current.

Figure 2:
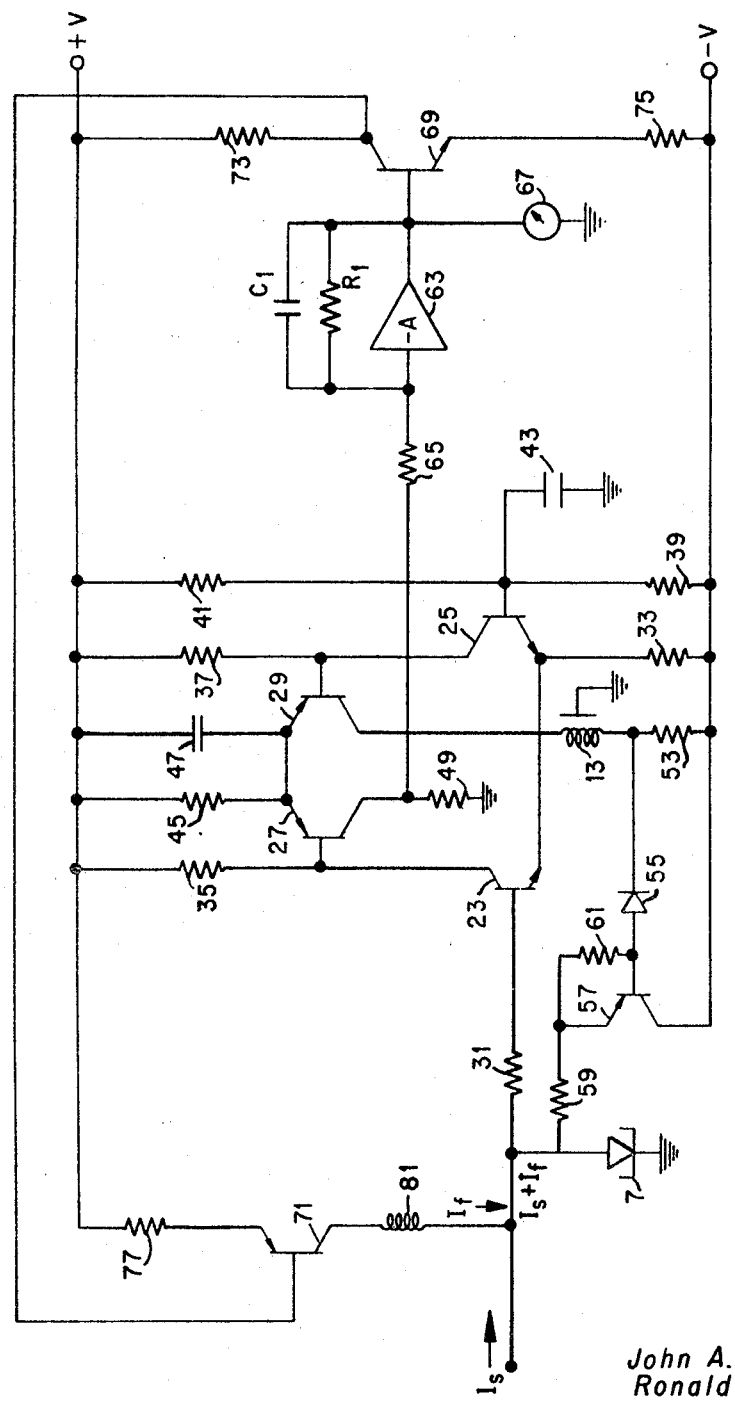
FIGURE 2 is a schematic diagram of a circuit for measuring pulsed currents which is depicted in block form in FIGURE 1.

Referring now to FIGURE 2 for a more specific description, a schematic diagram of the present instrument is shown. The input ($I_s$), which consists of positive current pulses, is coupled to the anode of tunnel diode 7. The cathode of diode 7 is connected to ground potential. The input of fast amplifier 9 is connected to the anode of tunnel diode 7. It senses the change in state of the diode 7 and provides a standardized pulse output along with a reset signal output by means of a double differential switching operation. This amplifier consists of transistors 23, 25, 27, and 29 with associated biasing circuitry. The base of transistor 23 is connected to the anode of tunnel diode 7 through a resistor 31. The emitter of transistor 23 is connected to the emitter of transistor 25 which is further connected to a negative voltage supply (—v.) through a resistor 33. The collectors of transistors 23 and 25 are connected to a positive voltage supply (+v.) through resistors 35 and 37, respectively. To complete the first differential switch, the base of transistor 25 is connected to —v. through a resistor 39, to +v. through a resistor 41, and to ground potential through a capacitor 43. Transistors 23 and 25 for mthe first differential switch which has a fixed threshold controlled by the voltage at the base of transistor 25. A standardized rectangular output pulse independent of the input pulse shape is obtained at the collector of both transistors 23 and 25. This standardized pulse has a constant width and amplitude but it varies in repetition rate depending on the switching rate of diode 7.

Transistors 27 and 29 form a second differential switch. The bases of transistors 27 and 29 are connected to the collectors of transistors 23 and 25, respectively, for receiving the standardized rectangular pulses. The emitters of transistors 27 and 29 are connected in common and further connected to +v. through a parallel RC network consisting of resistor 45 and capacitor 47. The collector of transistor 27 is connected to ground potential through a resistor 49. This second differential switch (transistors 27 and 29) is used to restore the D.C. levels of the standardized pulses and to provide a reset pulse taken at the collector of transistor 29 to reset tunnel diode 7 after a predetermined delay provided by delay line 13. Delay line 13 is connected between the collector of transistor 29 and —v. through a resistor 53.

A blocking diode 55 is connected between the output of delay line 13 and the base of a switching transistor 57 so that transistor 57 may remain cut off until a reset signal appears. The emitter of transistor 57 is connected to the anode of tunnel diode 7 through a resistor 59. Diode 55 prevents conduction in transistor 57 and thereby allows no current to flow through tunnel diode 7. The collector of transistor 57 is connected to —v. while a biasing resistor 61 is connected between the emitter and the base of transistor 57. An output pulse from delay line 13 turns transistor 57 on, allowing a negative voltage to be applied to the anode of tunnel diode 7 which resets the diode after a predetermined delay.

The undelayed output pulse from the fast amplifier, taken at the collector of transistor 27, is fed to the pulse rate-to-voltage converter, which consists of a high-gain operational amplifier 63 with $R_1$, $C_1$ feedback. The input of the converter is connected to the collector of transistor 27 through a resistor 65. The output of the converter is a voltage which is proportional to the average peak value of the current pulses being measured. At this point the voltage may be metered, as shown in the drawing, by means of a calibrated voltmeter 67 connected between the output of amplifier 63 and ground potential.

In order to maintain the proper current bias to tunnel diode 7 for bistable operation, the voltage-to-current converter and inverter 17 is provided. The converter consists of an NPN transistor 69 whose base electrode is connected to the output of amplifier 63 and a PNP transistor whose base electrode is connected to the collector electrode of transistor 69. The collector of transistor 69 is further connected to +v. through a resistor 73 while the emitter electrode of transistor 69 is connected to —v. through a resistor 75. The emitter of transistor 71 is connected to +v. through a resistor 77. The feedback current $I_f$ is taken at the collector of transistor 71 which is connected to the anode of tunnel diode 7 through an inductor 81. Inductor 81 blocks the input current $I_s$ from transistor 71, forcing it to flow through diode 7.

Figure 3:
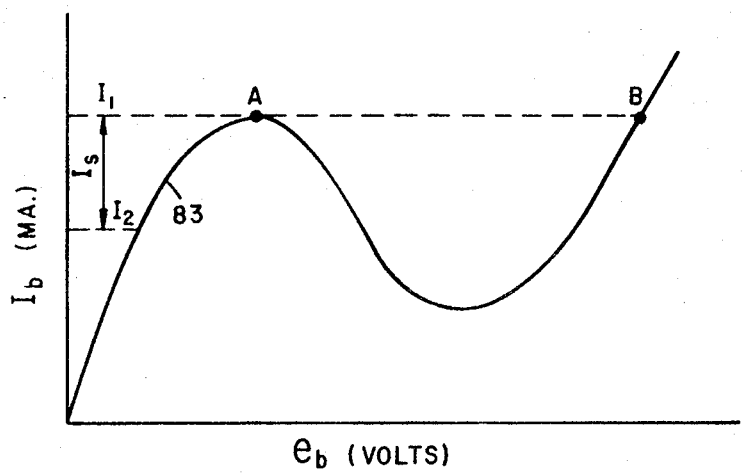
FIGURE 3 is a current voltage curve for a typical tunnel diode.

The operation of the instrument can be illustrated better by referring to FIGURE 3 which is a typical current-voltage curve 83 of tunnel diode 7. With no input signal ($I_s=0$), the tunnel diode is current-biased at point A by the feedback current $I_f$ being equal to $I_1$. The diode can then switch to its second stable state illustrated by point B due to a slight increase in the current $I_f$. This rise in current is brought about by the open loop gain of the system primarily at the output of the operational amplifier 63. At a fixed time (determined by the delay line 13) after setting diode 7 (switching to point B), the diode is reset to its initial state (point A) by the reset signal from the fast amplifier 9. This switching is sensed at the input of amplifier 9 which produces the standardized current pulses at its output. The repetition rate of these pulses is essentially constant when there is no input current ($I_s=0$). The current pulse is fed into pulse rate-to-voltage converter 15, thereby producing a D.C. voltage which, in turn, is converted to the proper feedback bias current $I_f$. For $I_s=0$, the bias current $I_f$ is equal to $I_1$ as indicated in FIGURE 3. The pulse rate necessary to sustain the bias current is determined by the open loop gain of the system.

When a signal current, $I_s$, consisting of a chain of pulses which may be varying in repetition rate, is injected at the input to diode 7 that tends to increase the diode bias current, the diode will, during the transient condition, switch from point A to point B at nearly the input pulse rate. This rapid chain of standardized pulses at the output of amplifier 9 causes the output voltage of converter 15 to increase. The feedback current, $I_f$, is then reduced to a new value $I_2$ due to the inversion which takes place in the feedback loop. As indicated in FIGURE 3, when a new stable condition is reached, the difference between this value and the original value $I_1$ is equal to the peak value of the input signal, $I_s$. Since the output voltage of the pulse rate-to-voltage converter is proportional to this current difference, it is also proportional to the peak signal current, $I_s$, and a measure thereof may be indicated on a calibrated meter, as shown in FIGURE 2, or recorded as a measure of the signal current on a recorder. When the bias current reaches its steady state value, the tunnel diode switching rate also reaches a steady state rate only slightly higher than the rate in the absence of an input signal.

Due to the high gain of the operational amplifier 63 of the pulse rate-to-voltage converter, only a slight change in repetition rate is necessary to provide the increased voltage output which is fed back through the voltage-to-current converter and inverter 17 to provide the reduced current $I_f=I_2$. Thus, as long as a chain of pulses is applied to the input, the meter 67 will follow the peak current of the pulse train. If the amplitude of the input pulses increases, the repetition rate of the standardized pulses will increase slightly, thus decreasing the value of $I_f$ and, if the amplitude of the input pulses decreases, the repetition rate of the standardized pulses will decrease slightly, thus increasing the value of $I_f$. When the tunnel diode is switched by an input pulse, $I_f$ is decreased very fast due to the fast action of the circuit and then increases gradually due to the decay time constant of the pulse rate-to-voltage converter 15, until the value of $I_s+I_f$ is sufficient to switch the diode again, remembering that the diode is reset after a predetermined delay each time it is set. Thus, it can be seen that the instrument is insensitive to pulse width or shape since only the peak of the current pulses, when added to $I_f$, causes the diode to be set. Further, it is insensitive to repetition rate since the tunnel diode is required to switch on a relatively small number of pulses per second.

The input current pulses which can be measured with the present instrument range from 0.25 ma. to 5 ma. in amplitude with base line widths ranging from microseconds to below a nanosecond (approximately $400 \times 10^{-12}$ sec.). The error in measuring these very short duration pulses is 5% or less for currents greater than 1 ma. in amplitude. At slightly larger pulse widths (0.5 nanosecond) this accuracy is achieved with even smaller currents. This meter is sensitive to repetition rate over a range of about 5 kHz. to over 100 mHz. Other current ranges may be covered by using different tunnel diodes which are commercially available.

The diode used in the present meter is a low capacitance tunnel diode which allows sensing of very short duration pulses. Thus, the voltage changes very rapidly, allowing these very short duration pulses flowing through the tunner diode to trigger the fast amplifier 9. In the embodiment described here, the standardized current pulses of amplifier 9 are positive pulses having a height of 12.5 ma. and a duration of 0.5 microsecond. The same pulse provides for the resetting of the tunnel diode 7 following a 0.5-microsecond delay from the collector of transistor 29 through delay line 13.

Variations in the circuit may be made without departing from the basic concept. For instance, the polarity of the pulses to be measured may be inverted from that disclosed by reversing the tunnel diode 7 and adapting the remaining circuitry to receive negative pulses and provide a positive feedback current ($I_f$).

Thus numerous variations may be made within the spirit and scope of the invention, and it is not intended to limit the invention except as defined in the following claims.

What is claimed is:

1. An instrument for measuring the amplitude of pulsed currents comprising: an input terminal for receiving current pulses to be measured; a bistable switching element coupled between said input terminal and ground potential; amplifier means coupled to said switching element for producing constant width pulses which vary in repetition rate responsive to said bistable operation of said switching element; reset means including a time delay network connected between said amplifier means and said switching element for providing a reset signal which resets said switching element in a first state once it has been set thereby controlling the width of said constant width pulses; a pulse rate-to-voltage converter connected to said amplifier means for receiving said constant width pulses, said pulse rate-to-voltage converter providing a voltage output proportional to the peak amplitude of said current pulses; feedback means connected between said pulse rate-to-voltage converter output and said switching element for providing a feedback current to said switching element sufficient for bistable operation; and indicating means connected to said pulse rate-to-voltage converter output for providing indication of the peak amplitude of said current pulses.

2. An instrument for measuring the amplitude of pulsed currents as set forth in claim 1 wherein said indicating means comprises a voltmeter connected between the output of said pulse rate-to-voltage converter and ground potential.

3. An instrument for measuring the amplitude of pulsed currents as set forth in claim 1 wherein said feedback means is a voltage-to-current converter and inverter comprising a first transistor having a base, emitter and collector electrodes, a second transistor having a base, emitter and collector electrodes, biasing means connected to said first and second transistors, said second transistor being of opposite conductivity type as that of said first transistor, said base electrode of said first transistor being connected to the output of said pulse rate-to-voltage converter, said collector electrode of said first transistor being connected to said base electrode of said second transistor, and said collector electrode of said second transistor being connected to the junction of said input terminal and said switching element.

4. An instrument for measuring the amplitude of pulsed currents as set forth in claim 1 wherein said amplifier means comprises a first differential switch having an input connected to the junction of said input terminal and said bistable switching means, said first differential switch having a first and second output, a second differential switch having a first and second input connected respectively to said first and second output of said first differential switch, and said second differential switch having a first output wherefrom said constant width pulses are taken and a second output connected to said reset means.

5. An instrument for measuring the amplitude of pulsed currents as set forth in claim 4 wherein said reset means comprises a transistor having a base, emitter and collector electrodes, said emitter electrode being coupled to said junction of said input terminal and said bistable switching element, said collector electrode being connected to a biasing voltage supply, and a delay line connected between said second output of said second differential switch and said base electrode of said transistor for providing a predetermined delay of said reset signal to said bistable switching element.

6. An instrument for measuring the amplitude of pulsed currents as set forth in claim 5, further including a blocking diode connected in series with said base lead of said transistor for preventing conduction through said transistor in the absence of a reset signal.

7. An instrument for measuring the amplitude of pulsed currents as set forth in claim 3, further comprising an inductor connected in series with said collector electrode of said second transistor for blocking said input pulses from said voltage-to-current converter.

8. An instrument for measuring the amplitude of pulsed currents as set forth in claim 1 wherein said bistable switching element is a tunnel diode.

References Cited

UNITED STATES PATENTS

| | | | |
|---|---|---|---|
| 3,062,970 | 11/1962 | Li | 331—107 XR |
| 3,064,193 | 11/1962 | Grubb et al. | 324—120 |
| 3,201,781 | 8/1965 | Holland | 324—99 XR |
| 3,212,027 | 10/1965 | Ko | 307—322 XR |
| 3,260,943 | 7/1966 | Huelsman et al. | 324—99 XR |
| 3,264,494 | 8/1966 | Candilis | 331—107 XR |
| 3,327,229 | 6/1967 | Huelsman | 324—99 XR |
| 3,375,351 | 3/1968 | Davenport et al. | 324—99 XR |

RUDOLPH V. ROLINEC, Primary Examiner

E. F. KARLSEN, Assistant Examiner

U.S. Cl. X.R.

324—99